United States Patent
Schmidtke et al.

(10) Patent No.: US 10,986,043 B1
(45) Date of Patent: Apr. 20, 2021

(54) DISTRIBUTED NETWORK SWITCHES OF DATA CENTERS

(71) Applicant: Facebook, Inc., Menlo Park, CA (US)

(72) Inventors: Hans-Juergen Schmidtke, Mountain View, CA (US); Jason M. Taylor, Piedmont, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 15/941,482

(22) Filed: Mar. 30, 2018

(51) Int. Cl.
  *G06F 15/173* (2006.01)
  *H04L 12/931* (2013.01)
  *H04L 12/933* (2013.01)

(52) U.S. Cl.
  CPC .......... *H04L 49/65* (2013.01); *H04L 49/1515* (2013.01)

(58) Field of Classification Search
  CPC .... G06F 1/3206; G06F 1/3209; G06F 1/3234; G06F 1/3287; G06F 1/329; G06F 1/00; H04L 49/00; H04L 12/28; Y02D 50/20; Y02D 10/171; Y02D 10/24; H04Q 11/00
  See application file for complete search history.

(56) References Cited

U.S. PATENT DOCUMENTS

| | | | | |
|---|---|---|---|---|
| 7,228,441 B2* | 6/2007 | Fung | ..................... | G06F 1/3203 713/300 |
| 8,107,458 B1* | 1/2012 | Ranganathan | .......... | H04L 41/12 370/254 |
| 8,457,121 B1* | 6/2013 | Sharma | ............... | H04L 41/0668 370/351 |
| 8,611,257 B1* | 12/2013 | Nachum | ............. | H04L 12/4013 370/255 |
| 9,092,223 B1* | 7/2015 | Pani | ..................... | G06F 1/3209 |
| 9,256,263 B1* | 2/2016 | Narayanan | ................ | G06F 1/28 |
| 9,876,735 B2* | 1/2018 | Davis | .................... | H04L 49/101 |
| 2004/0163001 A1* | 8/2004 | Bodas | ..................... | G06F 1/206 713/300 |
| 2011/0307718 A1* | 12/2011 | Aybay | .................. | G06F 1/3206 713/310 |
| 2013/0089104 A1* | 4/2013 | Davis | .................... | H04L 49/109 370/401 |
| 2018/0196496 A1* | 7/2018 | Franke | .................. | G06F 1/3296 |

* cited by examiner

*Primary Examiner* — Cheikh T Ndiaye
(74) *Attorney, Agent, or Firm* — Van Pelt, Yi & James LLP

(57) ABSTRACT

A first server device includes a server processor configured to perform a server processing task. The first server device also includes a network switch. The network switch of the first server device is directly connected to a higher level network switch. The network switch of the first server device is directly connected to a second server device that includes another server processor and another network switch.

20 Claims, 6 Drawing Sheets

US 10,986,043 B1

DISTRIBUTED NETWORK SWITCHES OF DATA CENTERS

BACKGROUND OF THE INVENTION

Classic data center network architecture typically relies on large scale network switches that can handle large amount of network traffic. Tiers of network switches are utilized to increase network capacity and to provide redundancy. As the number of servers in a data center increases, so does the number of large network switches required to connect them. One of the greatest operational challenges of data centers is power management. Network switches are one of the largest sources of power consumption in data centers. Because network switches are often in critical network paths in a data center, they are typically required to be always fully powered regardless of the amount of load on the data center. Thus, there is a need for a more efficient way to implement and manage network switches

BRIEF DESCRIPTION OF THE DRAWINGS

Various embodiments of the invention are disclosed in the following detailed description and the accompanying drawings.

DETAILED DESCRIPTION

Figure 1:
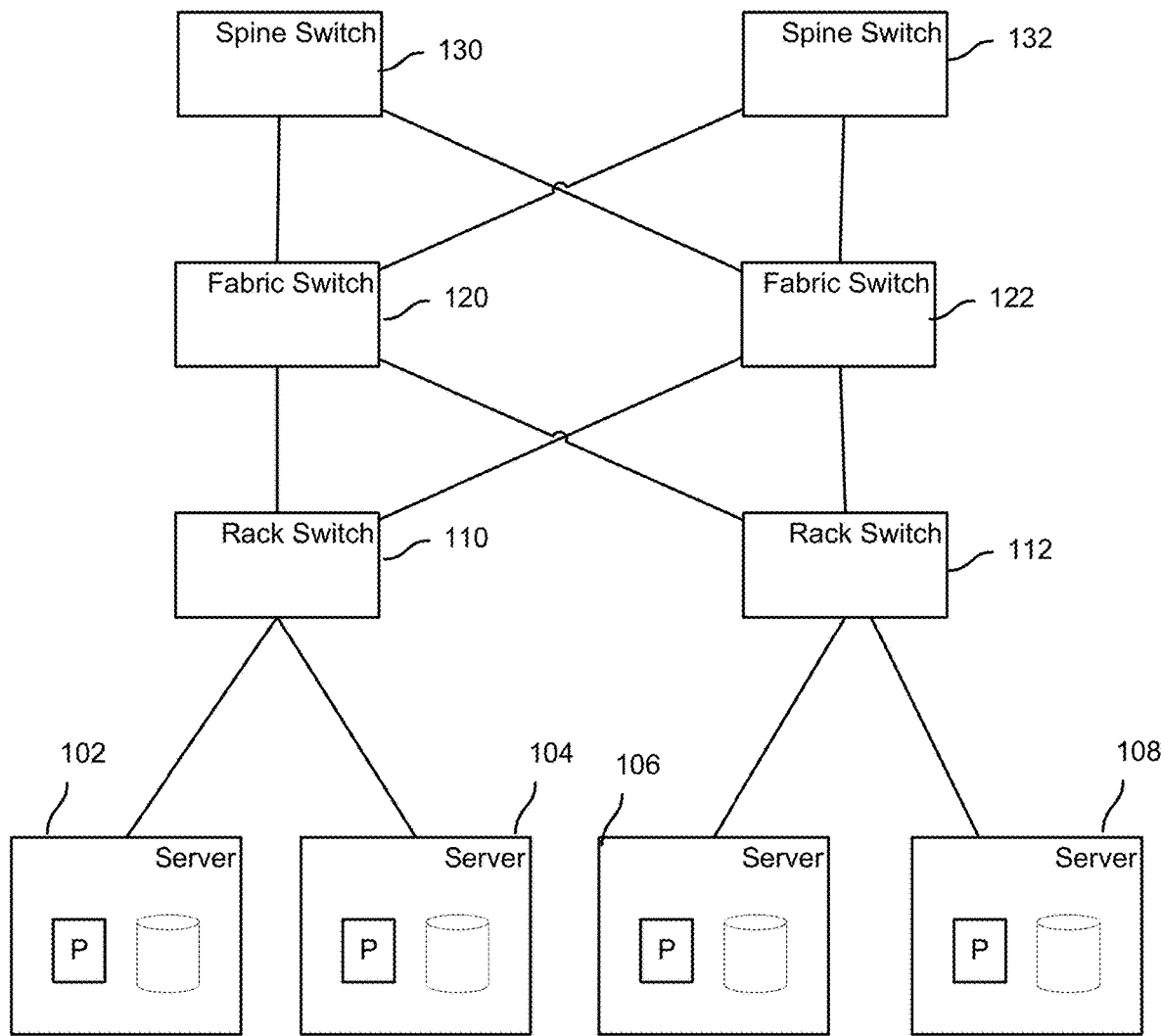
FIG. 1 is a block diagram illustrating an embodiment of a network configuration of a data center.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, rather than utilizing a large capacity network switch, network switch functionality is distributed among a larger number of smaller capacity network switches. In some embodiments, switches are pushed down into the end device level by integrating and including a switch inside each server device of a data center. For example, a server device includes a network switch, where the network switch of the server device is directly connected to a higher level network switch, and the network switch of the server device is directly connected to another server device that also includes its own network switch. The distributed nature can be further increased by replacing even higher level switches (e.g., switches in the spine switch level of a Clos network) with a larger number of interconnected lower capacity switches. Although this may result in a larger number of total connections in the network, it increases the dynamic configurability of the network. For example, given the increased redundancy of having a larger number of switches, underutilized switches can be dynamically powered on and off as needed to conserve power. The switches may be any type of network switch that connects devices together on a computer network (e.g., by using packet switching and/or statistical multiplexing to receive, process, forward, and route data between network devices). An example of a network switch described in this application is a fiber optic network switch.

FIG. 1 is a block diagram illustrating an embodiment of a network configuration of a data center. Servers 102, 104, 106, and 108 represent servers of a data center. The servers shown in the figure at least include a processor and a storage. These servers (e.g., network end point) may perform data processing, data storage/retrieval, and/or any other computer server functionality. For example, servers 102, 104, 106, and/or 108 provide data process and/or data storage services. Rack switches 110 and 112 belong to a top of a rack switch level of a hierarchy of network switch levels. Servers 102 and 104 are connected to rack switch 110 (e.g., top of rack switch). Servers 106 and 108 are connected to rack switch 112. For example, servers 102 and 104 are each a sled of a chassis/blade of a server rack/cabinet that also includes rack switch 110, and servers 106 and 108 are each a sled of a chassis/blade of a different server rack/cabinet that also includes rack switch 112.

Fabric switches 120 and 122 are both connected to rack switches 110 and 112. Fabric switches 120 and 122 belong to a fabric switch level that is higher than the rack switch level of the hierarchy of network switch levels. Spine switches 130 and 132 are both connected to fabric switches 120 and 122. Spine switches 130 and 132 belong to a spine switch level that is higher than the fabric switch level in the hierarchy of network switch levels. A fully connected Clos mesh network connection between the different levels of switches is shown. However, in various other embodiments, other network connection topology may be utilized.

In the network configuration shown in FIG. 1, spine switches 130 and 132 and fabric switches 120 and 122 are large capacity switches (e.g., greater than 12 Tbps of total bandwidth capacity each) that each consume a relatively large amount of power. Regardless of the amount of network utilization (e.g., even if network utilization is low), these switches are fully powered due to the configuration requirements and the level of redundancy required.

A limited number of components have been shown in FIG. 1 to simplify the example and illustrate the embodiment clearly. Any number of components shown in FIG. 1 may exist in various embodiments. For example, a data center is likely to include many more instances of the components shown in FIG. 1. Not all components have been shown. In some embodiments, the example shown in FIG. 1 is a simplification of selected components of a fabric network. An example of the fabric network is illustrated in FIG. 2.

Figure 2:
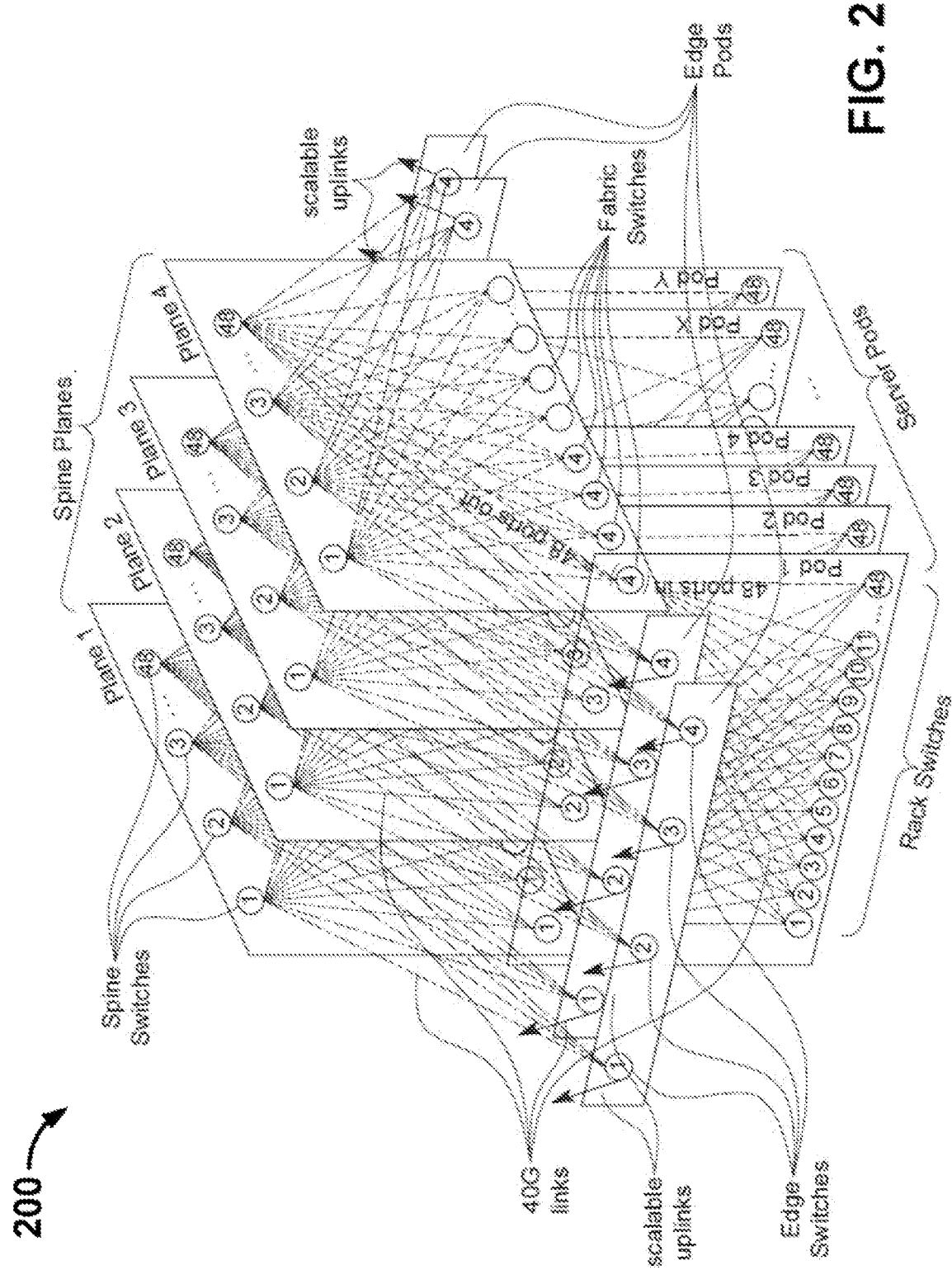
FIG. 2 is a diagram illustrating an embodiment of a fabric network configuration of a data center.

FIG. 2 is a diagram illustrating an embodiment of a fabric network configuration of a data center.

Fabric network 200 includes a plurality of server pods (e.g., a layer3 micro-cluster). Each pod is an identical standard "unit of network" in fabric network 200. In the example shown, each pod is served by a set of four fabric switches (e.g., including fabric switch 120 of FIG. 1) that are connected to 48 rack switches (TOR) switches (e.g., including rack switch 110 of FIG. 1). The top of rack (TOR) switches are each housed in a server rack and are connected to servers (e.g., including server 102 of FIG. 1) of the server rack. In one example, each TOR switch has 4×40G uplinks, providing 160G total bandwidth capacity for a rack of 10G-connected servers.

For each downlink port to a TOR switch, an equal amount of uplink capacity is reserved on the pod's fabric switches, which allows the network performance to scale up to statistically non-blocking. Four independent "planes" of spine switches are shown, each scalable up to 48 independent devices within a plane. Each fabric switch of each pod connects to each spine switch within its local plane. Together, pods and planes form a modular network topology.

For external connectivity, fabric network 200 includes a flexible number of edge pods (e.g., each capable of providing up to 7.68 Tbps to the backbone and to back-end inter-building fabrics on data center sites, and scalable to 100 Gbps and higher port speeds within the same device form factors).

This highly modular design allows capacity to quickly scale in any dimension, within a uniform framework. For example, when more compute capacity is needed, additional server pods are added. When more intra-fabric network capacity is needed, additional spine switches on all planes may be added. When more extra-fabric connectivity is needed, additional edge pods may be added or uplinks may be scaled on the existing edge switches.

In some embodiments, Border Gateway Protocol (BGP) 4 is used as the routing protocol. In some embodiments, a centralized BGP controller is able to override any routing paths on the fabric by pure software decisions. Fabric network 200 may make use of equal-cost multi-path (ECMP) routing, with flow-based hashing. To prevent occasional "elephant flows" from taking over and degrading an end-to-end path, the network is multi-speed (e.g., with 40G links between all switches, while connecting the servers on 10G ports on the TOR switches). There are also server-side means to "hash away" and route around trouble spots, if they occur.

Figure 3:
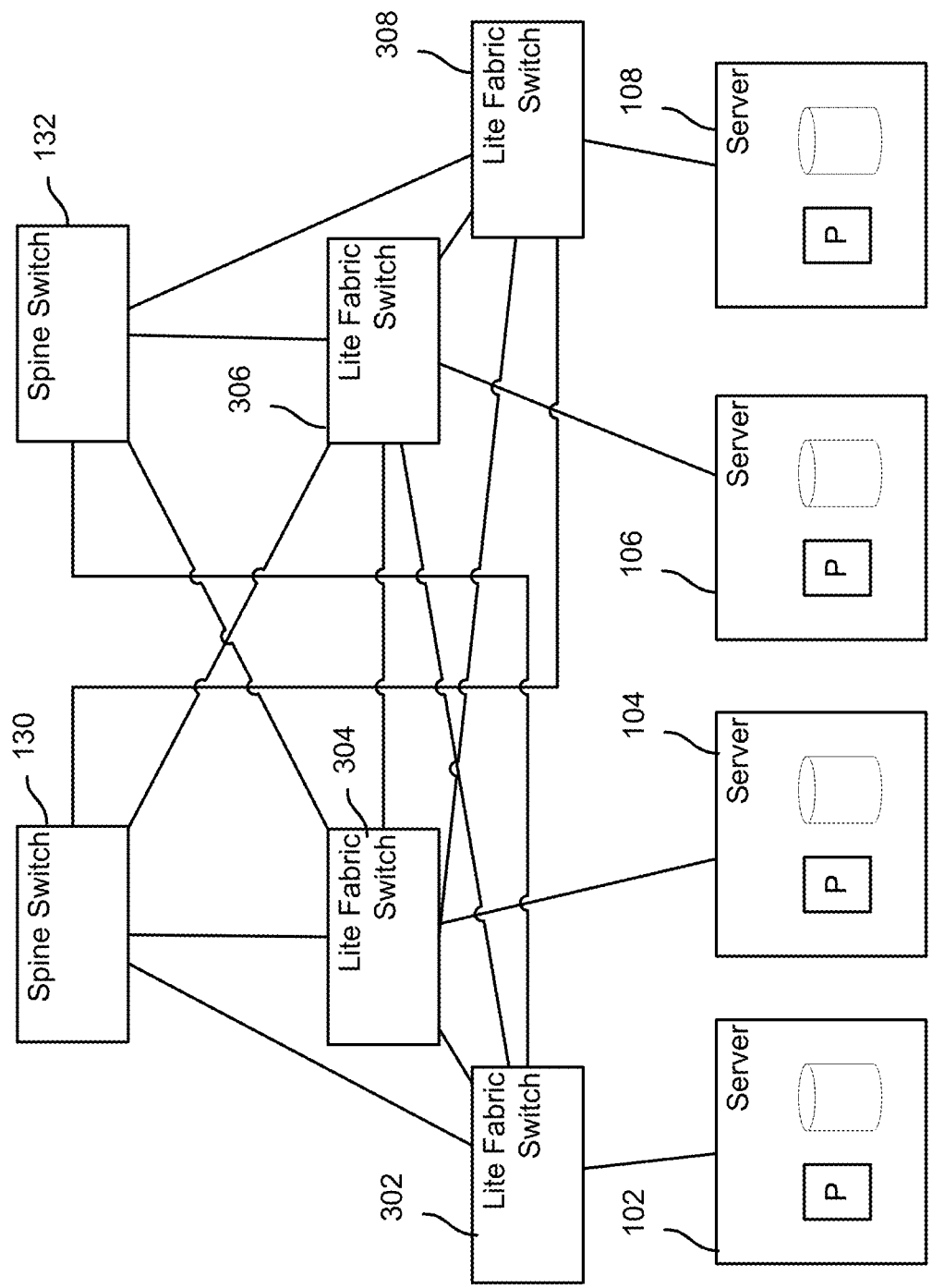
FIG. 3 is a flowchart illustrating an embodiment of a network configuration utilizing an expanded number of lower capacity fabric switches.

FIG. 3 is a flowchart illustrating an embodiment of a network configuration utilizing an expanded number of lower capacity fabric switches. Instead of using high capacity fabric switches 120 and 122 of FIG. 1, FIG. 3 shows an alternative network configuration where a larger number of fabric switches are utilized. As compared to each of fabric switches 120 and 122 of FIG. 1, each of fabric network switches 302, 304, 306, and 308 is able to handle a smaller amount of network bandwidth. However, the number of fabric switches has been increased to achieve the same desired network performance (e.g., one switch with capacity of 12.8 Tbps is replaced by four switches each with a capacity of 3.2 Tbps). A lower capacity switch consumes less power than a higher capacity switch. By using a higher number of lower capacity switches (with an associated number of an increased number of connections), switches can be dynamically powered off to dynamically reduce power consumption and reduce network capacity when not needed and dynamically powered on to dynamically increase network capacity when needed. For example, if it is determined that server 102 is no longer needed due to reduced computing load and network switching/routing of switch 302 is not needed for required network performance, switch 302 is powered down (e.g., placed in low power state and not used to switch/route network traffic). This allows network traffic to be switched/routed via other fabric switches.

In the example shown in FIG. 3, top of rack switches are not utilized and instead servers 102, 104, 106, and 108 are directly connected to fabric switches 302, 304, 306, and 308, respectively. In an alternative embodiment, top of rack switches are utilized (e.g., see FIG. 1) and the top of rack switches are connected to the lower capacity fabric switches 302, 304, 306, and 308.

The network connections (network connection topology) shown in FIG. 3 is merely an example. In various other embodiments, other network connection topologies may be utilized. A limited number of components have been shown in FIG. 3 to simplify the example and illustrate the embodiment clearly. Any number of components shown in FIG. 3 may exist in various embodiments. For example, a data center is likely to include many more instances of the components shown in FIG. 3. Not all components have been shown. In some embodiments, the example shown in FIG. 3 illustrates a selected portion of the components of a fabric network. An example of the fabric network is illustrated in FIG. 2 and one or more of the fabric switches shown in FIG. 2 can be replaced by a larger number of lower capacity fabric switches (e.g., as shown in FIG. 3).

Figure 4:
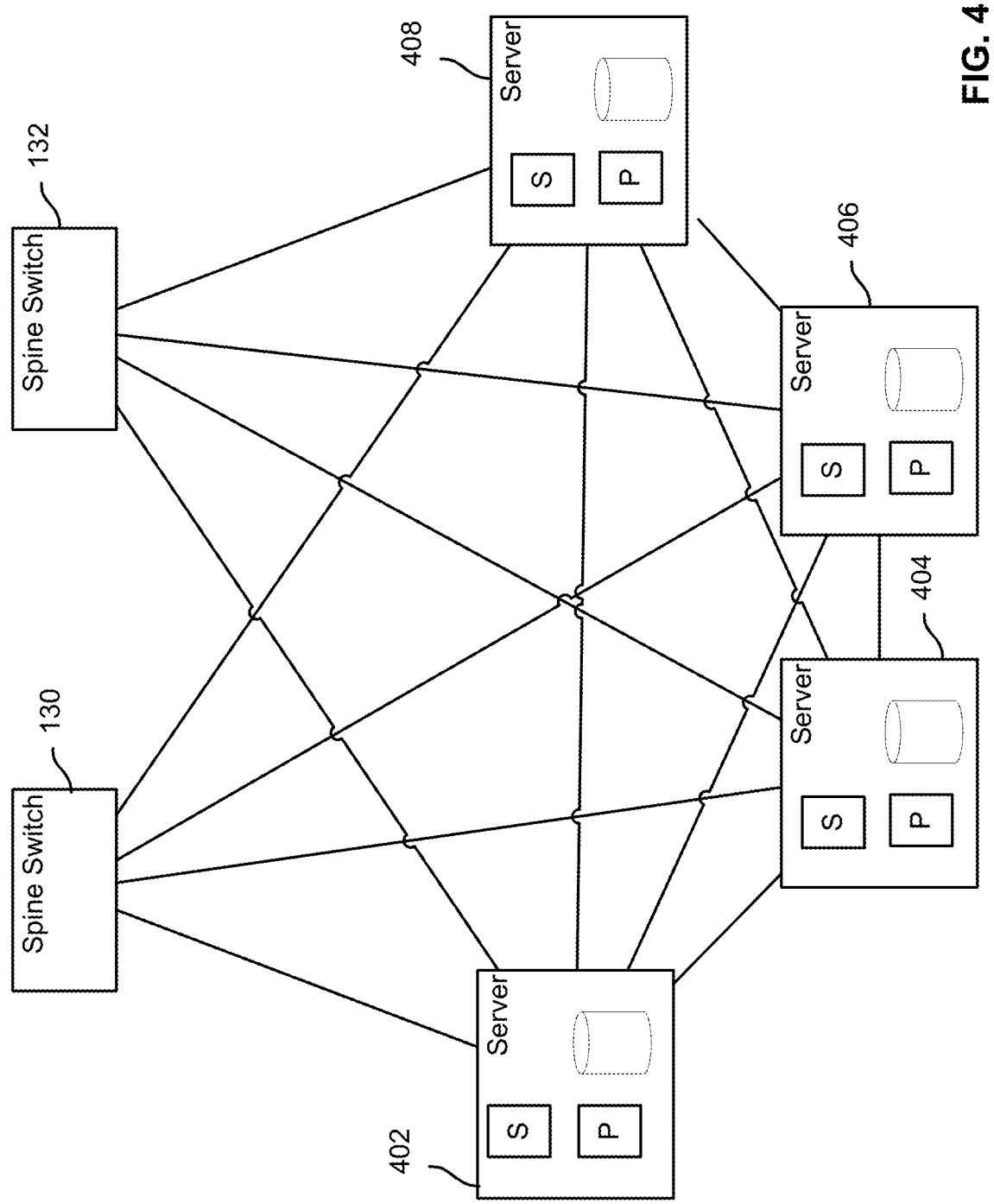
FIG. 4 is a block diagram illustrating an embodiment of a network configuration utilizing servers with integrated network switches.

FIG. 4 is a block diagram illustrating an embodiment of a network configuration utilizing servers with integrated network switches. In various embodiments, FIG. 4 represents a massively distributed network with a cornerstone of a computer, storage and network device. Instead of using separate fabric switches 302, 304, 306, and 308 of FIG. 3, FIG. 4 shows an alternative network configuration where each server includes an integrated network switch. For example, server 402 is effectively an integration of fabric switch 302 of FIG. 3 in server 102, server 404 is effectively an integration of fabric switch 304 of FIG. 3 in server 104, server 406 is effectively an integration of fabric switch 306 of FIG. 3 in server 106, and server 408 is effectively an integration of fabric switch 308 of FIG. 3 in server 108.

In addition to typical server components such as a processor and data storage utilized to provide processing and data retrieval/storage services at a server, the server includes an integrated network switch (e.g., included in the same device as the server). For example, rather than just including a network interface controller, the server includes an integrated network switch component with multiple ports that is able to handle network packet switching and/or statistical multiplexing to receive, process, forward, and route data between other network devices connected via the ports of the network switch. The components of the server, including the network switch, may be all included in the same sled device of a chassis/blade of a network rack/cabinet. In some embodiments, the switches of the servers operate on a fabric switch level of the network configuration shown in FIG. 2. Much like fabric switches 302, 304, 306, and 308 of FIG. 3, the increase in the number of switches due to their integration into the servers allows a larger distributed network of lower capacity switches and also allows dynamic adjustment of network capacities and associated power consumption. Servers 402, 404, 406, and 408 each include a processor, a storage, and a network switch. The included network switch includes a network chip (e.g., network switch application-specific integrated circuit chip). Servers 402, 404, 406, and 408 are connected directly to spine switches 130 and 132 as well as to each other.

The network connections (network connection topology) shown in FIG. 4 is merely an example. In various other embodiments, other network connection topologies may be utilized. A limited number of components have been shown in FIG. 4 to simplify the example and illustrate the embodiment clearly. Any number of components shown in FIG. 4 may exist in various embodiments. For example, a data center is likely to include many more instances of the components shown in FIG. 4. Not all components have been shown. In some embodiments, the example shown in FIG. 4 illustrates a selected portion of the components of a fabric network. An example of the fabric network is illustrated in FIG. 2 and one or more of the rack switches and the fabric switches shown in FIG. 2 can be removed and replaced by a larger number of switches integrated into server devices (e.g., server devices 402, 404, 406, and 408) that directly connect to spine switches.

Switches on the spine level can also be replaced by or utilize a larger number of lower capacity switches to allow dynamic adjustment of network capacities and associated power consumption. Spine switch 130 and/or spine switch 132 in FIGS. 1, 3, 4 as well as any of spine switches shown in FIG. 2 can be replaced by a larger number of lower capacity switches that are each connected to the same network devices as the corresponding larger capacity switch. Much like the fabric layer switches in the previously discussed embodiments, by utilizing a larger number of lower capacity switches that together provide the same effective network capacity, desired ones of the switches can be dynamically powered down and up based on network demand, allowing power to be conserved when switches can be dynamically powered down.

Figure 5:
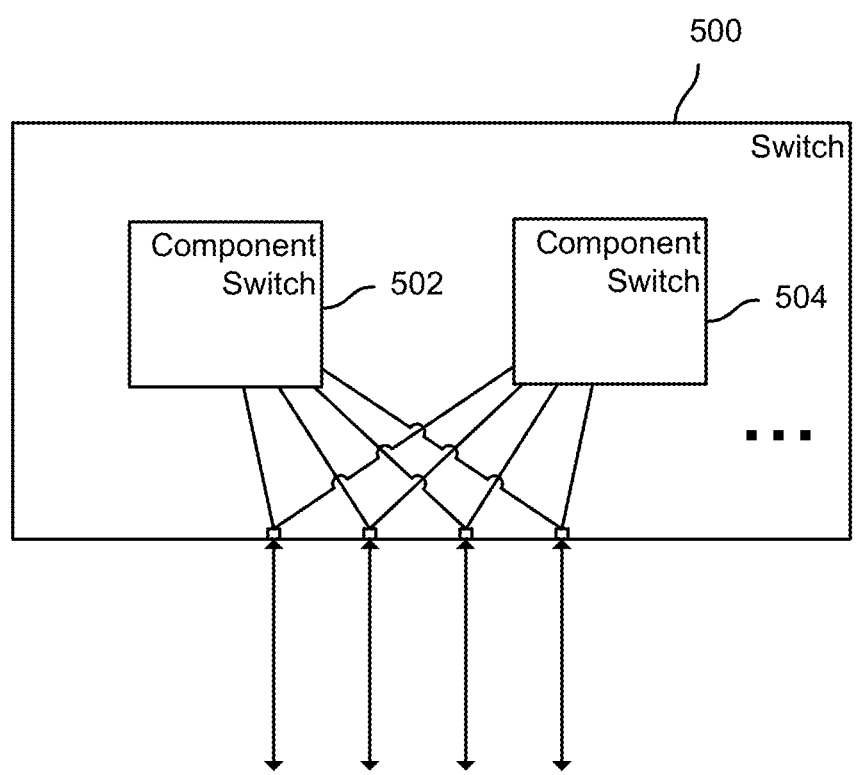
FIG. 5 is a block diagram illustrating an embodiment of a network switch.

FIG. 5 is a block diagram illustrating an embodiment of a network switch.

Switch 500 shown in FIG. 5 includes at least component switches 502 and 504. Although switch 500 is a single network switch device, it effectively includes a plurality of independently functioning component switches. Each of component switches 502 and 504 is able to independently perform packet switching and/or statistical multiplexing to receive, process, forward, and route data between other network devices connected to any of the ports of switch 500. This allows switch 500 to dynamically turn off and on its component switches independently as desired. For example, when network load or utilization is low, component 502 can be automatically turned off to save power. When utilization or network load increases, component 502 can be automatically turned on to increase network capacity. Component switches 502 and 504 may each include its own network switch ASIC (application-specific integrated circuit) chip (e.g., each component switch includes an identical switch chip). These chips are on a same circuit board in some embodiments, while in other embodiments the ASIC chips are on different circuit boards that are connected together within a same physical device of switch 500. A switch that includes a plurality of switch components can be utilized in place of any of the switches shown in FIGS. 1-4. Although switch 500 is shown to have only four ports and two component switches, this is merely an example and any number of ports and any number of component switches may be included in various versions of switch 500. Not all component have been shown.

Figure 6:
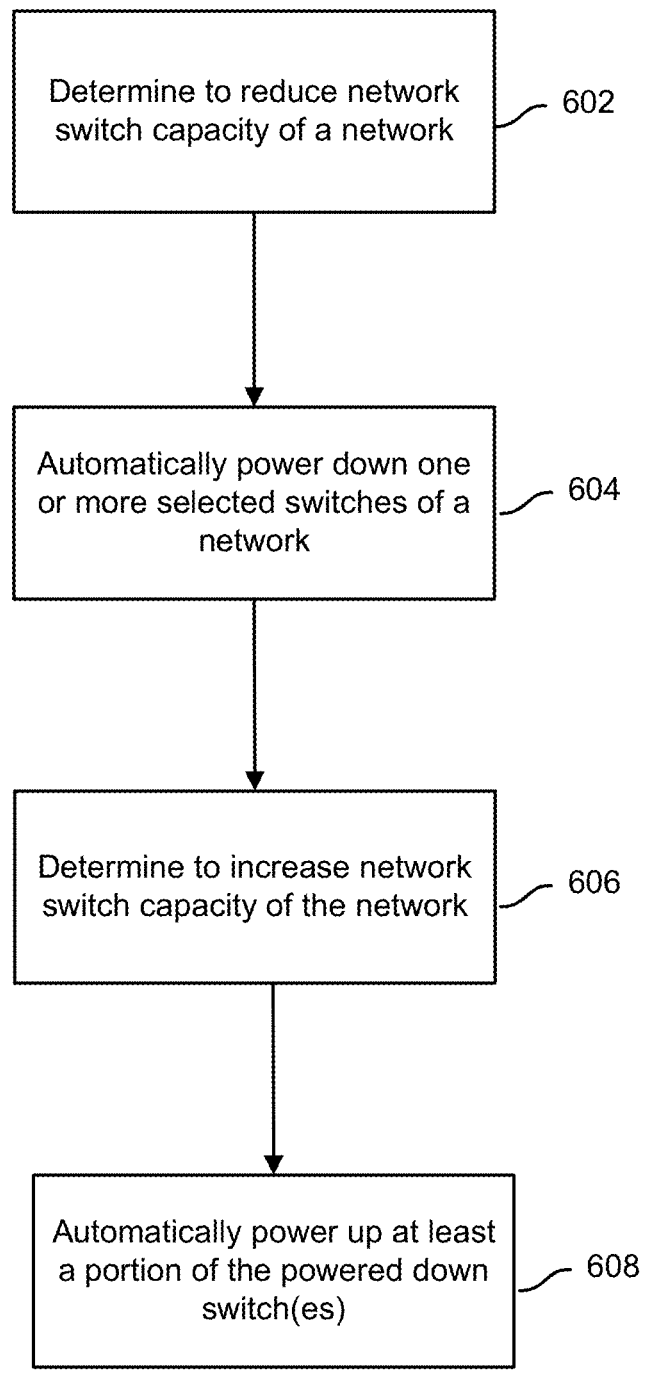
FIG. 6 is a flowchart illustrating an embodiment of a process for automatically managing a network switch.

FIG. 6 is a flowchart illustrating an embodiment of a process for automatically managing a network switch. At least a portion of the process of FIG. 6 may be implemented by a network switch (e.g., a switch shown in FIGS. 1-5) and/or a network component that manages one or more network switches.

At 602, it is determined to reduce network switch capacity of a network. In some embodiments, it is determined that a utilization rate or a network load is below a threshold level and in response it is determined to reduce network switch capacity. For example, it is determined that a utilization rate or a network load associated with a specific network switch of a data center is below a threshold level and in response it is determined to reduce network switch capacity by powering down the specific network switch. In another example, it is determined that a network load associated with one or more network paths of a specific network switch is below a threshold level and in response it is determined to reduce network switch capacity by powering down the specific network switch. In some embodiments, it is determined that a server load of one or more servers associated with a network switch (e.g., one or more servers directly connected to the network switch) is below a threshold level and in response it is determined to reduce network switch capacity. In some embodiments, it is determined that a reduction in power consumption of a data center is desired (e.g., due to reduction in available power, power outage, increase power need in another area, etc.) and it is automatically determined to reduce network switch capacity.

At 604, one or more selected network switches are automatically powered down. For example, given a reduction in network switch utilization, power downing and not utilizing at least a portion of one or more selected network switches will not significantly affect network performance. By powering down the one or more selected network switches, desired power saving can be achieved. By using a relatively larger number of power capacity switches in place of a traditional large capacity network switch, these selected network switches are able to be powered down while maintaining desired network performance due to the additional other alternative network paths and routing capabilities offered by the remaining lower capacity network switches.

In some embodiments, powering down a switch includes placing the switch in low-power mode. For example, an ASIC chip and/or a processor of a switch is placed in an off or low-power mode. In some embodiments, powering down a switch includes disabling the switch (e.g., disable from being used to switch/route network traffic). In some embodiments, powering down a switch includes powering down a subset of component switches of the switch. For example, component switch 502 of switch 500 of FIG. 5 is powered down while component switch 504 is not powered down.

In some embodiments, the network switch(es) to be powered down are selected based on the amount of network switch capacity determined to be reduced (e.g., number of switches selected to be powered down such that the remaining capacity of the other switches meets a determined minimum level). In some embodiments, the network switch(es) to be powered down are selected based on the utilization rate or network load associated with the selected network switch(es) (e.g., switch is selected to be powered down if its utilization rate is below a threshold value). In some embodiments, the network switch(es) to be powered down are selected based on a network branch associated with the selected network switch(es) (e.g., switches of a selected network branch are to be powered down). In some embodiments, the network switch(es) to be powered down are selected based on a switch hierarchy level associated with the selected network switch(es) (e.g., a subset of switches belonging to a specific switch hierarchy level detected to be associated with a capacity utilization rate below a threshold level is selected to be powered down). In some embodiments, the network switch(es) to be powered down are selected based on a workload associated with servers connected to selected network switch(es) (e.g., switches associated with server(s) with a workload below a threshold level are to be powered down). In some embodiments, the network switch(es) to be powered down are selected based on an amount of power desired to be reduced (e.g., number of switches to be powered down are selected such that power savings from it meets a desired power reduction amount).

At 606, it is determined to increase network switch capacity. In some embodiments, it is detected that a utilization rate or a network load is above a threshold level and in response it is determined to increase network switch capacity. For example, it is determined that a capacity utilization rate or a network load associated with one or more network switches of a specific switch hierarchy level of a data center is above a threshold level and in response it is determined to increase network switch capacity by powering up a powered down network switch in the specific switch hierarchy level. In another example, it is determined that a capacity utilization rate or a network load associated with one or more network paths is above a threshold level and in response it is determined to increase network switch capacity by powering up a network switch associated with the network path. In some embodiments, it is determined that a server load of one or more servers associated with a powered down network switch (e.g., one or more servers directly connected to the powered down network switch) is above a threshold level and in response it is determined to increase network switch capacity by powering up the switch. In some embodiments, it is determined that a reduction in power consumption of a data center is no longer needed (e.g., due to an increase in available power, power outage ended, etc.) and it is automatically determined to increase network switch capacity by powering up a switch.

At 608, at least a portion of the one or more selected network switches is automatically powered up. In some embodiments, powering up a switch includes placing the switch out of a low-power mode. For example, an ASIC chip and/or a processor of a switch is placed in an on or normal/high power mode. In some embodiments, powering up a switch includes enabling the switch (e.g., enable it to be used to switch/route network traffic). In some embodiments, powering up a switch includes powering up a subset of component switches of the switch. For example, component switch 502 of switch 500 of FIG. 5 that was previously powered down is powered up.

The switch(es) that are to be powered up may be selected based on the amount of network switch capacity determined to be increased (e.g., number of switches to be powered up is selected such that the total aggregated switch capacity meets a determined minimum level). In some embodiments, the network switch(es) to be powered up are selected based on the capacity utilization rate or the network load associated with the selected network switch(es). In some embodiments, the network switch(es) to be powered up are selected based on a network branch associated with the selected network switch(es) (e.g., switches of a selected network branch are to be powered up). In some embodiments, the network switch(es) to be powered up are selected based on a switch hierarchy level associated with the selected network switch(es) (e.g., switches belonging to a specific switch hierarchy level detected to be associated with a capacity utilization rate above a threshold level are selected to be powered up). In some embodiments, the network switch(es) to be powered up are selected based on a workload associated with servers connected to selected network switch(es) (e.g., switches associated with server(s) with a workload above a threshold level are to be powered up). In some embodiments, the network switch(es) to be powered up are selected based on an amount of additional power allowed to be consumed (e.g., number of switches to be powered up is selected such that the power consumption increase from it is still below a threshold).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a server processor configured to perform a server processing task, wherein the server processor is configured to provide to an external network device, via a network as a network end-point, a service of a data center; and
 a network switch, wherein the server processor and the network switch are different components included together in a same first server device;
 wherein the network switch of the first server device is directly connected to a higher level network switch, and the network switch of the first server device is directly connected to a second server device that includes another server processor and another network switch;
 wherein the network switch includes a first component application-specific integrated circuit switch chip and a second component application-specific integrated circuit switch chip, and the first component application-specific integrated circuit switch chip is configured to be independently powered down from the second component application-specific integrated circuit switch chip based on an available amount of power and a workload of the server processor included in the same first server device with the network switch that includes both the first chip and the second chip.

2. The system of claim 1, wherein the network switch includes a network switch chip different from the server processor.

3. The system of claim 1, wherein the higher level network switch is a spine switch of a hierarchy of switch levels.

4. The system of claim 1, wherein the network switch is configured to perform packet switching between other network devices connected to the first server device.

5. The system of claim 1, wherein the first server device provides a data processing service.

6. The system of claim 1, wherein the first server device provides a data storage service.

7. The system of claim 1, wherein the server processor and the network switch are integrated together in a single sled of a chassis of a network rack.

8. The system of claim 1, wherein the higher level network switch includes a plurality of redundant component switches included in a same switch device.

9. The system of claim 1, wherein the first server device and the second server device are a part of a same server rack.

10. The system of claim 1, wherein the first server device and the second server device are a part of a same fabric network.

11. The system of claim 1, wherein a capacity of the network switch is greater than 3 Tbps.

12. A method comprising:
    determining that a network switch capacity of a data center is to be reduced, including by determining that a power consumption of the data center is to be reduced due to a reduction in an available amount of power;
    in response to the determination that the network switch capacity of the data center is to be reduced, automatically powering down a selected subset of network switches of a specific network switch hierarchy level of the data center;
    determining that the network switch capacity of the data center is to be increased; and
    in response to the determination that the network switch capacity of the data center is to be increased, automatically powering up at least a portion of the selected subset of the network switches of the specific network switch hierarchy level of the data center, wherein the number of the network switches to be powered up are selected based on an amount of available power and an associated network branch;
    wherein the selected subset of network switches includes at least one network switch with a first component application-specific integrated circuit switch chip and a second component application-specific integrated circuit switch chip, and the first component application-specific integrated circuit switch chip is configured to be independently powered down from the second component application-specific integrated circuit switch chip based on an available amount of power and a workload of a server processor included in a same device with the at least one network switch that includes both the first chip and the second chip.

13. The method of claim 12, wherein determining that the network switch capacity of the data center is to be reduced includes determining that a power consumption of the data center is to be reduced.

14. The method of claim 12, wherein determining that the network switch capacity of the data center is to be reduced includes determining that a utilization rate of one or more switches of the specific network switch hierarchy level is below a threshold level.

15. The method of claim 12, wherein automatically powering down the selected subset of network switches includes disabling the selected subset of network switches.

16. The method of claim 12, wherein automatically powering down the selected subset of network switches includes placing the selected subset of network switches in a low-power mode.

17. The method of claim 12, wherein the selected subset of network switches belongs to a network path selected to be disabled.

18. The method of claim 12, wherein a certain network switch included in the selected subset of network switches includes a plurality of component switches and automatically powering down the selected subset of network switches includes powering down at least one of the plurality of component switches while not powering down another component switch of the certain network switch.

19. The method of claim 12, wherein determining that the network switch capacity of the data center is to be increased includes determining that a utilization rate of remaining not powered down switches of the specific network switch hierarchy level is above a threshold level.

20. The method of claim 12, wherein the portion of the selected subset of the network switches to be powered up is selected based on a determined desired amount of increased network switch capacity.

* * * * *